Dec. 23, 1969     C. L. VAN BRUNT     3,485,305
TRASH REMOVING DEVICE

Filed May 8, 1967     2 Sheets-Sheet 1

INVENTOR.
CORWIN L. VAN BRUNT
BY
Williamson, Palmatier
& Baird ATTORNEYS

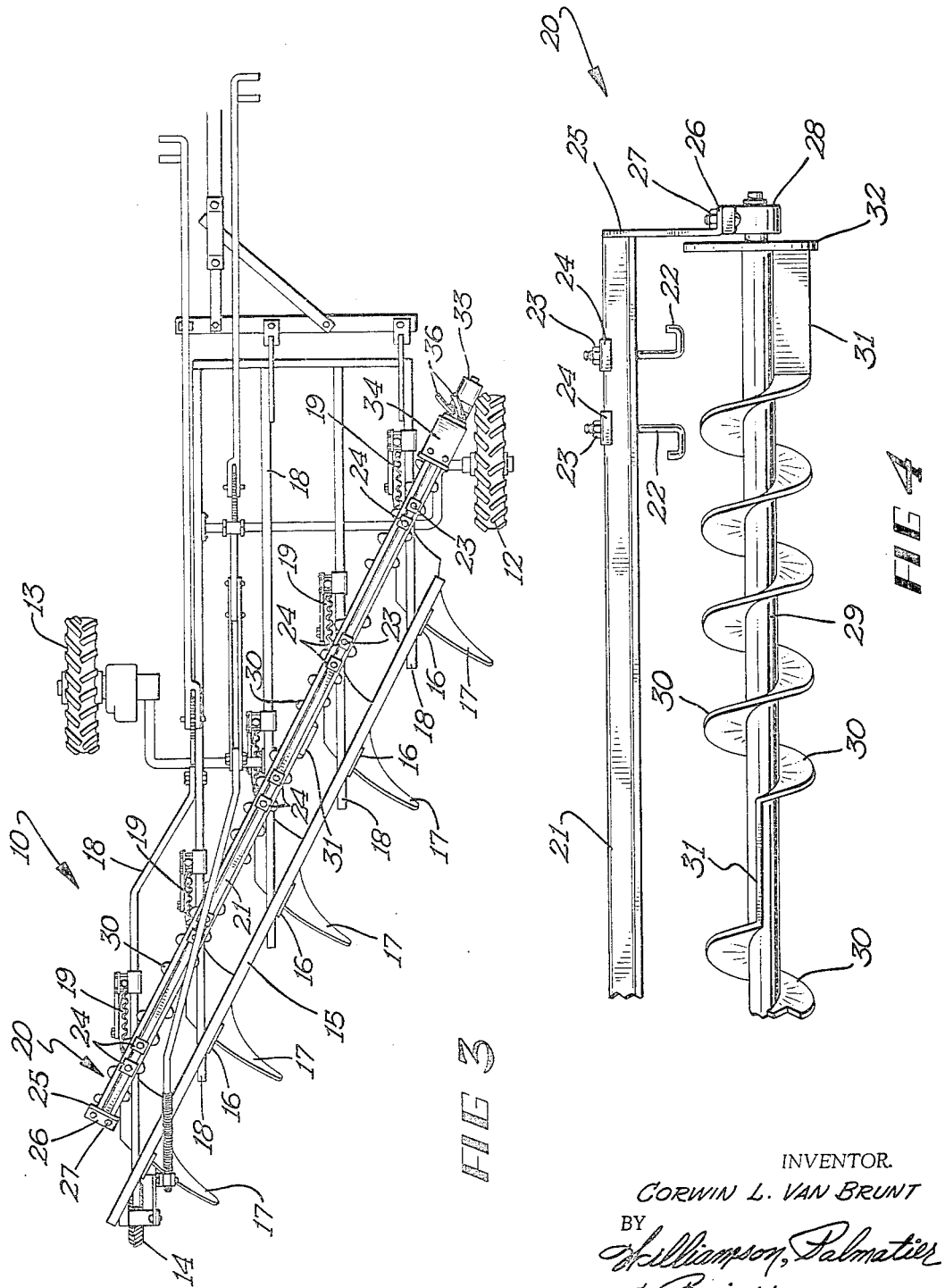

United States Patent Office 3,485,305
Patented Dec. 23, 1969

3,485,305
TRASH REMOVING DEVICE
Corwin L. Van Brunt, R.F.D. 2, Truman, Minn. 56088
Filed May 8, 1967, Ser. No. 636,843
Int. Cl. A01b 3/46, 9/00, 33/02
U.S. Cl. 172—39
6 Claims

ABSTRACT OF THE DISCLOSURE

A device for impelling debris, trash and the like towards the plows of a gang plow implement, including an elongate shaft mounted forwardly and above the plows and having a plurality of helical blades thereon for positively moving the debris longitudinally of the shaft. A plurality of substantially flat impeller elements on said shaft located between adjacent helical blades and forwardly and above the plows, which serve to impel the debris rearwardly and downwardly. Power means connected to the shaft for revolving the same.

---

This invention relates to a device for effectively removing trash, debris and the like, with respect to gang plow implements.

An object of this invention is to provide a novel trash removing device, of simple and inexpensive construction for attachment to a gang plow implement, which is operable during movement of the implement to positively impel debris, trash and the like, rearwardly and downwardly into the path of the elevated furrow of soil being formed by the moldboard to thereby prevent accumulation of trash and debris between the ground surface and the implement frame.

A more specific object of this invention is to provide a trash removing device or gang plow implements, which includes an elongate shaft having a plurality of helical blades thereon, which move trash, debris and the like transversely of the implement, and the plurality of impeller elements, each being located between a pair of adjacent helical blades and each serving to impel the debris downwardly and rearwardly, so that the debris is effectively plowed under and is prevented from accumulating forwardly of the plow standard.

These and other objects and advantages of this invention will more fully appear from the following description made in connection with the accompanying drawings wherein like reference characters refer to the same or similar parts throughout the several views, and in which:

FIG. 3 is a perspective view of one side of the implement illustrating the other end of the trash removing device; and FIG. 4 is a top plan view of the implement illustrating the location and relationship of the trash removing device with respect to the plows.

Figure 1:
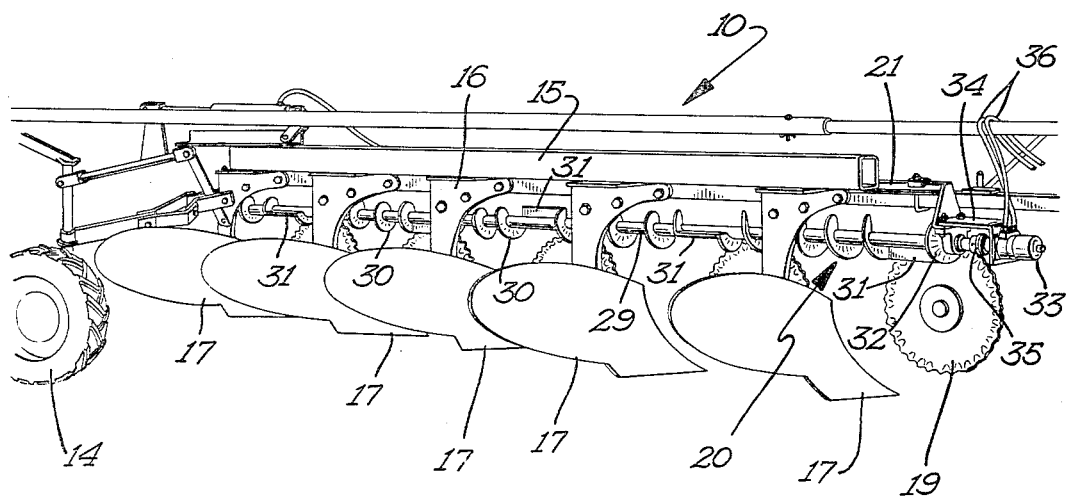
FIG. 1 is a perspective view of a portion of a conventional gang plow implement incorporating the novel trash removing device.
Figure 2:
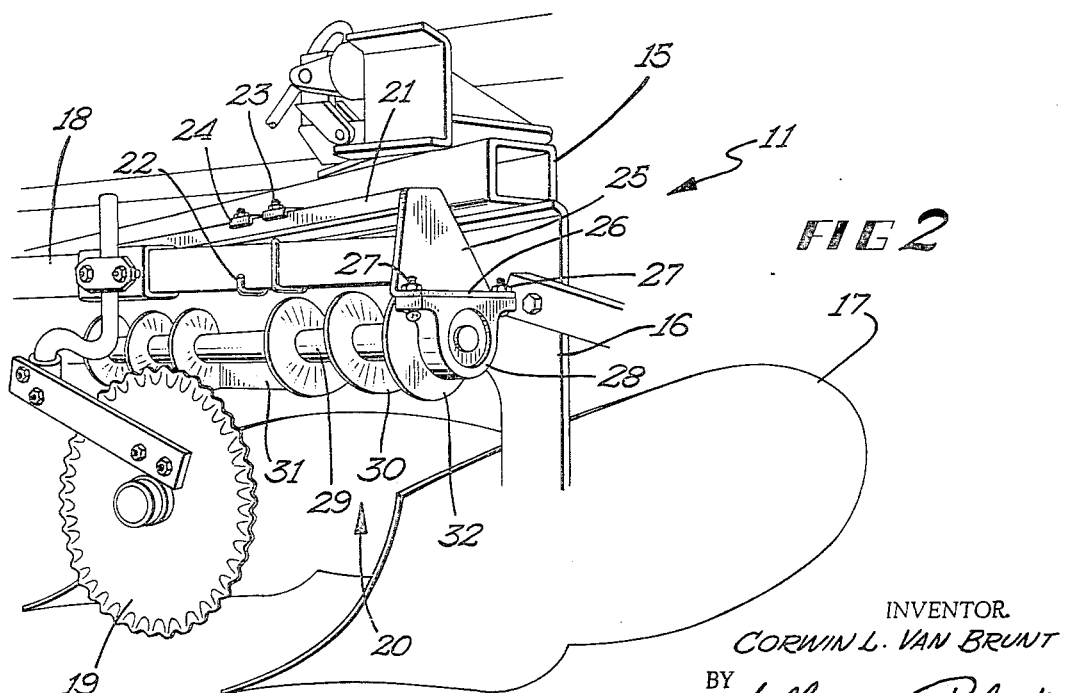
FIG. 2 is a side elevational view of one end portion of the trash removing device on an enlarged scale.

Referring now to the drawings, and more specifically to FIGS. 1 and 4, it will be seen that a conventional gang plow implement, designated generally by the reference numeral 10, is there shown. Implement 10 includes an implement frame 11, which is supported by a land wheel 12, furrow wheel 13 and a rear wheel 14, which are adjustable in a well-known manner. The implement frame includes a plow beam 15 to which is secured the standards 16 of the moldboard type plows 17. The plows 17 are, of course, arranged in echelon and the implement is adapted to be towed by a tractor. The implement includes a plurality of rolling coulters 19, which depend from the longitudinally extending frame bars 18, all of which is conventional in the gang plow implement field.

One of the attendant problems incurred during the plowing operation is the accumulation of trash, debris and the like, forwardly of the plow standards which progressively builds up and acts against the implement frame to tend to lift the plow bottoms from their correct plowing depth. This debris may include corn stalks, stems, straw, dirt clods and the like, and unless the debris is effectively removed, does interfere with the plowing operation. Means are therefore provided for effectively moving the debris and for directing this material rearwardly into the path of the soil being elevated by the plow bottom.

This means includes a trash removing device, designated generally by the reference numeral 20 and includes a mounting assembly comprised of an elongate substantially straight rigid mounting bar 21, formed of a suitable metallic material and preferably being of rectangular cross-sectional configuration. The mounting bar 21 is positioned upon the frame bars 18 and extends transversely of the implement frame and substantially parallel to the plow beam 15. This mounting bar 21 is provided with apertures therein through which project J-bolts 22, the upper ends of which are threaded for receiving a nut 23 thereon. An apertured clip 24 is provided for each J-bolt and is interposed between the upper surface of the mounting bar 21 and the nut 23, the J-bolt 22 projecting through the aperture in the associated clip. The J-bolts 22 are adapted to engage the lower surface of the frame bars 18 whereby upon tightening of the nuts 23, the mounting bar will be clamped against these frame bars. In the embodiment shown, two such J-bolt units are provided, although additional units may be indicated under certain conditions.

Each end of the mounting bar 21 has a downwardly projecting L-shaped bracket 25 secured thereto, as by welding, and the outturned flange 26 of each bracket is apertured to receive the nut and bolt assemblies 27, which are used to mount pillow bearings 28 thereon. These pillow bearings journal opposite ends of an elongate preferably tubular shaft 29 therein, which as shown, also extends transversely of the implement frame.

It will be noted that the shaft 29 is displosed substantially parallel of the plow beam 15 and is positioned forwardly of and above the plows 17. The shaft 29 has a plurality of helical blades 30 integrally formed therewith and these blades are all righthand thread type and are all of substantially the same length. It will be noted, that each of the blades 30 extends between each plow and the shaft is rotated in a direction so the material will be conveyed by the blades from the rearmost plow towards the forwardmost plow. The shaft 29 also a plurality of substantially flat axially extending radially projecting impeller elements 31 secured thereto, and each of these impeller elements are integral with one end of each of the helical blades 30. It will be noted, that the width or radial dimension of impeller each element is substantially equal to the corresponding dimension of the helical blades. However, the axial dimension of each impeller element is substantially less than the axial dimension of each helical blade.

In the embodiment shown, the shaft 29 has an impeller element 31 positioned between each helical blade 30 and also has an impeller element positioned at each end portion of the shaft. Each end of the shaft 29 also has an annular flange 32 integrally fromed therewith and projecting radially therefrom. It will be noted, that the outer circumferential edge of the flanges 32 project slightly beyond the outer edge of the adjacent impeller element 31 and the outer helical edge of the helical blades 30.

Means are also provided for power revolving the shaft 29 and this means includes a rotary hydraulic motor 33 which is mounted on an L-shaped bracket 34, which is secured to the adjacent bracket 25 by those nut and bolt assemblies 27 used to bolt the adjacent pillow bearing to the bracket 25. A suitable coupling mechanism 35 is used to couple the end of the shaft 29 to the output shaft of the rotary motor and the motor is provided with conduits 36 which interconnect the motor with the hydraulic system of the tractor. Suitable valve control means will be provided on the tractor for permitting the operator to selectively operate the hydraulic motor 33 as desired.

During the operation of the trash removing device, the plows will be in the lowered position and debris will tend to collect forwardly of the plow beam and generally blew othe frame. The control valves to the motor 33 will be actuated to allow fluid to operate the rotary motor and the shaft 29 will be revolved in a direction to cause the helical blades to convey material longitudinally of the shaft from the rearmost plow towards the forwardmost plow. The debris will be moved helically by the blades but as the material is moved progressively to the right, the impeller elements will impel the debris in a positive manner rearwardly and downwardly and directly into the path of the furrow being formed by the raised soil, so that the material will be plowed under in a continuous manner. In this regard, it will be noted that each of the impeller elements is positioned just forward and above the moldboard of an adjacent plow. With this arrangement, material is constantly being moved first in a transverse directioin of travel with respect to the implement and thereafter continuously is impelled rearwardly so that this debris is being plowed under. Thus, not only does the device prevent accumulation of this material under the frame which would tend to pull the plow bottoms from proper depth relation, but this material is positively removed in such a manner that the material is plowed under. Thus, the helical blades serve to continuously move the material to prevent clogging and to convey the material directionally for position to be impelled rearwardly and downwardly.

From the foregoing description, it will be seen that I have provided a novel trash removing device, which is especially adaptable for use with gang type plows, and which is operable to continuously cause debris, such as corn stalk, straw and the like to be impelled rearwardly into the path of the moldboards of the plow bottoms so that the trash will be plowed or turned under.

Thus, it will be seen that I have provided a trash removing device which is not only of simple and inexpensive construction, but one which functions in a more efficient manner than any heretofore known comparable device.

It will, of course, be understood that various changes may be made in the form, details, arrangement and proportions of the various parts without departing from the scope of my invention.

What is claimed is:

1. A trash removing device for use with a gang plow implement including a frame,
an elongate plow beam mounted on said frame,
a plurality of laterally-spaced apart moldboard plows secured to the beam and being disposed in echelon arrangement,
said trash removing device including a mounting assembly releasably clamped to the frame,
an elongate revolvable shaft journalled on said mounting assembly and extending transversely of the frame, said shaft being disposed above and forwardly of the plows and having a plurality of longitudinally spaced apart similar helical blades secured thereto, said helical blades extending between adjacent plows,
a plurality of longitudinally spaced apart impeller elements on said shaft each being positioned between adjacent helical blades and each impeller element positioned forwardly and above one of the plows, each impeller element being disposed generally in a plane extending substantially longitudinally of the shaft,
drive means interconnected with said shaft for revolving the same whereby trash, debris and the like will be moved longitudinally of the shaft by said helical blades and will be impelled downwardly and rearwardly by said impeller elements.

2. The trash removing device as defined in claim 1 wherein each of said impeller elements is substantially planar and extends substantially axially of said shaft and projects substantially radially thereof.

3. The trash removing device as defined in claim 1 wherein each end of said shaft has an impeller element affixed thereto.

4. The trash removing device as defined in claim 1 wherein said shaft extends obliquely of the implement frame and is revolved in a direction so that the trash, debris and the like is moved transversely of the frame from the rearmost plow towards the forwardmost plow.

5. The trash removing device as defined in claim 1 wherein said mounting assembly includes an elongate mounting bar, clamping elements on said bar releasably engaging said frame, bearings at opposite ends of said bar revolvably mounting said shaft, and means mounting said drive means on one end of said mounting bar.

6. The trash removing device as defined in claim 3 wherein each of said impeller elements has one end thereof integral with the adjacent helical blade.

References Cited

UNITED STATES PATENTS 3,091,873   6/1963   West _____ 172—66
3,152,648   10/1964  Wildt et al. _____ 172—39 X ROBERT E. PULFREY, Primary Examiner RONALD C. HARRINGTON, Assistant Examiner U.S. Cl. X.R.

172—71, 119, 532